(12) United States Patent
Cheng

(10) Patent No.: US 11,270,089 B2
(45) Date of Patent: Mar. 8, 2022

(54) ELECTRONIC WORK CARD, CONTROL METHOD THEREOF AND DEVICE, STORAGE MEDIUM AND ATTENDANCE MANAGEMENT SYSTEM

(71) Applicant: BOE Technology Group Co., Ltd., Beijing (CN)

(72) Inventor: Xinyi Cheng, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 126 days.

(21) Appl. No.: 16/760,070

(22) PCT Filed: Mar. 28, 2019

(86) PCT No.: PCT/CN2019/080263
§ 371 (c)(1),
(2) Date: Apr. 29, 2020

(87) PCT Pub. No.: WO2020/191780
PCT Pub. Date: Oct. 1, 2020

(65) Prior Publication Data
US 2021/0232781 A1 Jul. 29, 2021

(51) Int. Cl.
*G06K 7/10* (2006.01)
*G06K 19/07* (2006.01)
(Continued)

(52) U.S. Cl.
CPC ..... *G06K 7/10366* (2013.01); *G06K 19/0723* (2013.01); *G07C 1/10* (2013.01); *G08C 17/02* (2013.01)

(58) Field of Classification Search
CPC .. G06K 7/10366; G06K 19/0723; G07C 1/10; G07C 17/02; G06Q 10/00;
(Continued)

(56) References Cited

U.S. PATENT DOCUMENTS

2009/0217076 A1* 8/2009 Okuhara .................. G07C 1/10
713/600
2010/0312606 A1* 12/2010 Gala ................ G06Q 10/06398
705/7.26
(Continued)

FOREIGN PATENT DOCUMENTS

CN 104036603 A 9/2014
CN 104537722 A 4/2015
(Continued)

*Primary Examiner* — Orlando Bousono
(74) *Attorney, Agent, or Firm* — Arent Fox LLP; Michael Fainberg

(57) ABSTRACT

The present disclosure discloses an electronic work card, a control method and device thereof, a storage medium and an attendance management system. The electronic work card includes: a controller and a Radio Frequency Identification (RFID) device; wherein the RFID device is configured to identify at least one actuator in the environment, receive the identification information provided by the at least one actuator when the at least one actuator is identified, and send the trigger information to the controller; the controller is configured to obtain the identification information of the actuator after receiving the trigger information of the actuator, determine whether the electronic work card is in the preset workplace according to the identification information, and in response to determining that the electronic work card is not in the preset workplace, control at least part of the functions of the electronic work card to enter the non-working state.

20 Claims, 4 Drawing Sheets

```
The actuator radiates the electromagnetic signals within a certain range and    ┌─ S41
writes the identification information to the RFID module after identifies the
RFID module in the electronic work card After identifying the electromagnetic signal sent by the actuator, the RFID     ┌─ S42
module receives the identification information of the actuator and sends the
trigger information to the control module After receiving the trigger information of the actuator, the control module     ┌─ S43
obtains the identification information of the actuator, and determines
whether the electronic work card is in the preset workplace according to the
identification information; and if not, controls at least part of the functions
of the electronic work card to enter the non-working state
```

(51) Int. Cl.
*G07C 1/10* (2006.01)
*G08C 17/02* (2006.01)

(58) Field of Classification Search
CPC ........... G06Q 10/06; G06Q 10/063114; G06Q 10/1091; H04L 67/12
See application file for complete search history.

(56) References Cited

U.S. PATENT DOCUMENTS

2014/0207635 A1* 7/2014 Pappas ................. G06Q 10/109
  705/32
2019/0057340 A1* 2/2019 Wang ............. G06Q 10/063114

FOREIGN PATENT DOCUMENTS

| CN | 107644515 A | 1/2018 |
| CN | 207473687 A | 6/2018 |

* cited by examiner

ELECTRONIC WORK CARD, CONTROL METHOD THEREOF AND DEVICE, STORAGE MEDIUM AND ATTENDANCE MANAGEMENT SYSTEM

The present application is a US National Stage of International Application No. PCT/CN2019/080263, filed on Mar. 28, 2019, and entitled "electronic work card, control method thereof and device, storage medium and attendance management system", the content of which is incorporated by reference herein in its entirety.

FIELD

The present disclosure relates to the technical field of intelligent office, and especially relates to an electronic work card, a control method thereof and a device, a storage medium and an attendance management system.

BACKGROUND

At present, the work card has become an indispensable part of a company. The work card not only can be used as employee identification, but further gradually realizes electronization and intelligentization. For example, the electronic work card can realize data acquisition and positioning of employees. However, the electronic work card in the prior art has the disadvantages of higher power consumption, short standby time, and poor user experience.

SUMMARY

In some embodiments of the present disclosure, the embodiment of the present disclosure provides an electronic work card which includes a controller and a Radio Frequency Identification (RFID) device;

the RFID device is configured to identify at least one actuator in the environment, receive the identification information provided by the at least one actuator when the at least one actuator is identified, and send the trigger information to the controller;

the controller is configured to obtain the identification information of the actuator after receiving the trigger information of the actuator, determine whether the electronic work card is in a preset workplace according to the identification information, and in response to determining that the electronic work card is not in a preset workplace, control at least part of the functions of the electronic work card to enter a non-working state.

In some embodiments of the present disclosure, the RFID device is configured to successively identify at least two actuators in the environment, receive the identification information provided by each of the at least two actuators upon identification to each of the at least two actuators, and send the trigger information to the controller;

the controller is configured to obtain the identification information of each actuator after receiving the trigger information corresponding to each of the at least two actuators, determine whether the electronic work card is in the preset workplace according to the identification information, and in response to determining that the electronic work card is not in a preset workplace, control at least part of the functions of the electronic work card to enter the non-working state.

In some embodiments of the present disclosure, the electronic work card further includes a communication circuit electrically connected to the controller;

the controller is configured to realize network connection with a gateway through the communication circuit when the electronic work card is determined to be in the preset workplace;

the controller is further configured to disconnect the communication circuit and the gateway when the electronic work card is determined to be out of the preset workplace.

In some embodiments of the present disclosure, the electronic work card further includes a timing circuit;

the timing circuit is configured to periodically send wake-up information to the controller when the electronic work card is in the preset workplace;

the controller is configured to control the communication circuit to stop the network maintenance information interaction with the gateway before receiving the wake-up information, and to control the communication circuit to perform network maintenance information interaction with the gateway after being triggered by the wake-up information.

In some embodiments of the present disclosure, the electronic work card further includes an inertial measurement component and a positioning information detector;

the inertial measurement component is configured to determine whether the cumulative displacement of the electronic work card within the set time is greater than a preset threshold when the controller determines that the electronic work card is in the preset workplace; in response to determining that the electronic work card is in a preset workplace, control the positioning information detector to detect the positioning information broadcasted in the environment by the controller; and in response to determining that the electronic work card is not in a preset workplace, control the positioning information detector to stop detecting the positioning information broadcasted in the environment.

the positioning information detector is configured to turn on the detection of the positioning information broadcasted in the environment or turn off the detection of the positioning information broadcasted in the environment under the control of the controller.

In some embodiments of the present disclosure, the controller is configured to turn off the function of at least one of the timing circuit, the inertial measurement component, and the positioning information detector when the electronic work card is determined to be out of the preset workplace.

In some embodiments of the present disclosure, the electronic work card further includes a power circuit electrically connected to the controller;

the controller is configured to turn off the power circuit when the electronic work card is out of the preset workplace.

In some embodiments of the present disclosure, the controller is further configured to determine the duration of residence of the electronic work card in the preset workplace according to the time information of receiving the triggering information corresponding to the actuator.

In some embodiments of the present disclosure, the embodiment of the present disclosure provides an attendance management system which includes the above electronic work card, and the at least one actuators;

the at least one actuator is configured to radiate an electromagnetic signal within a certain range, and write identification information to the RFID device after identifying the RFID device of the electronic work card;

the identification information is configured to distinguish the different actuators.

In some embodiments of the present disclosure, the attendance management system further includes a gateway, and a server electrically connected to the gateway;

the gateway is configured to realize network connection with the communication circuit in the electronic work card and perform network maintenance information interaction with the communication circuit;

the server is configured to perform data information interaction with the electronic work card through the gateway.

In some embodiments of the present disclosure, the embodiment of the present disclosure provides the control method of the above electronic work card, including:

receiving the trigger information of the actuator sent by the RFID device by the controller;

obtaining the identification information of the actuator by the controller; and determining whether the electronic work card is in the preset workplace according to the obtained identification information by the controller; and in response to determining that the electronic work card is not in a preset workplace, controlling at least part of the functions of the electronic work card to enter the non-working state by the controller.

In some embodiments of the present disclosure, the step of controlling at least part of the functions of the electronic work card to enter the non-working state by the controller includes:

when the controller determines that the electronic work card is out of the preset workplace, turning off the function of the communication circuit.

In some embodiments of the present disclosure, the control method further includes the steps of:

receiving the wake-up information by the controller; stopping the communication circuit from performing network maintenance information interaction with the gateway before receiving the wake-up information by the controller; and performing network maintenance information interaction with the gateway via the communication circuit by the controller after being triggered by the wake-up information.

In some embodiments of the present disclosure, the control method further includes the step of: turning off the function of at least one of the communication circuit, the timing circuit, the inertial measurement component, and the positioning information detector by the controller when the electronic work card is determined to be out of the preset workplace.

In some embodiments of the present disclosure, the control method further includes:

turning off the power circuit when determining that the electronic work card is out of the preset workplace by the controller.

In some embodiments of the present disclosure, the control method further includes:

determining the duration of residence of the electronic work card in the preset workplace according to the time information of receiving the identification information of the actuator by the controller.

In some embodiments of the present disclosure, the embodiment of the present disclosure provides a control device of the above electronic work card, including:

a receiving unit, configured to receive the trigger information of the at least one actuator sent by the RFID device;

an acquisition unit, configured to obtain the identification information of the at least one actuator; and a control unit, configured to determine whether the electronic work card is in the preset workplace according to the obtained identification information; and in response to determining that the electronic work card is not in a preset workplace, control at least part of the functions of the electronic work card to enter the non-working state.

In some embodiments of the present disclosure, the control unit is configured to disconnect the communication circuit and the gateway when the electronic worker plate is out of the preset workplace.

In some embodiments of the present disclosure, the receiving unit is further configured to receive the wake-up information; the controller controls the communication circuit to stop the network maintenance information interaction with the gateway before receiving the wake-up information;

the control unit is further configured to perform the network maintenance information interaction with the gateway via the communication circuit after being triggered by the wake-up information.

In some embodiments of the present disclosure, the embodiment of the present disclosure provides a nonvolatile storage medium which stores the computer executable instructions configured to cause the computer to perform the control method according to any of the embodiments above.

DETAILED DESCRIPTION OF THE EMBODIMENTS

In view of the problem of short standby time of the electronic work card caused by the higher power consumption in the prior art, the embodiment of the present disclosure provides an electronic work card, a control method and device thereof, a storage medium and an attendance management system.

In combination with the attached drawings, the following is a detailed description of the specific implementation of the electronic work card, the control method and device thereof, the storage medium and the attendance management system provided in the embodiment of the present disclosure. The sizes and shapes of the sections in the attached drawings do not reflect the true proportions, and merely indicate the contents of the present disclosure.

Figure 1:
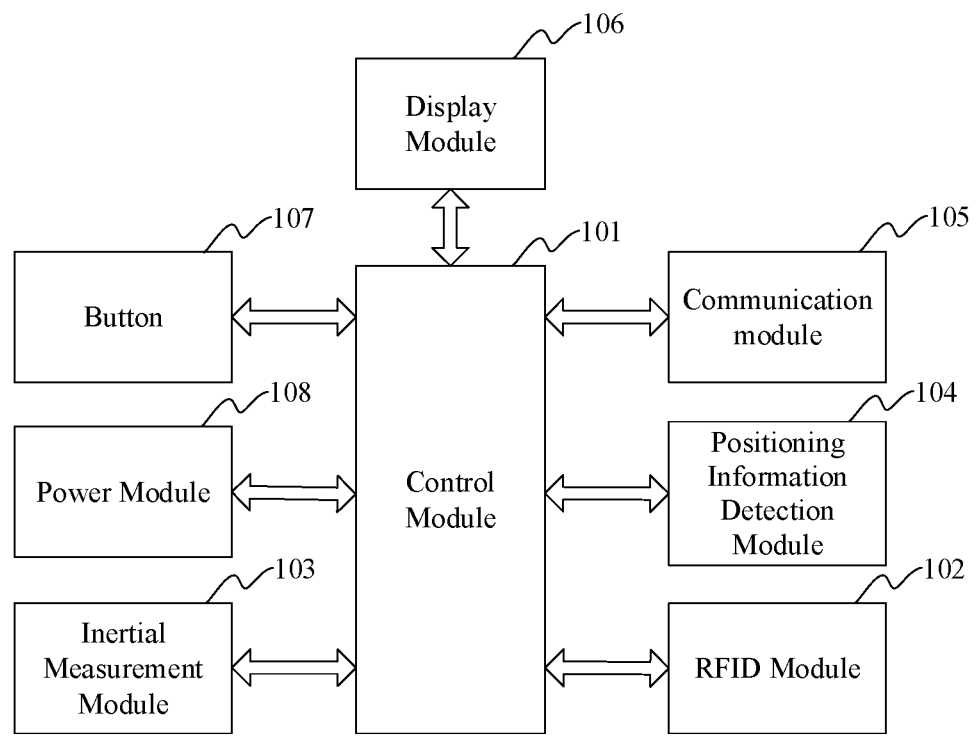
FIG. 1 is a structural diagram of the electronic work card provided in the embodiment of the present disclosure.
Figure 2:
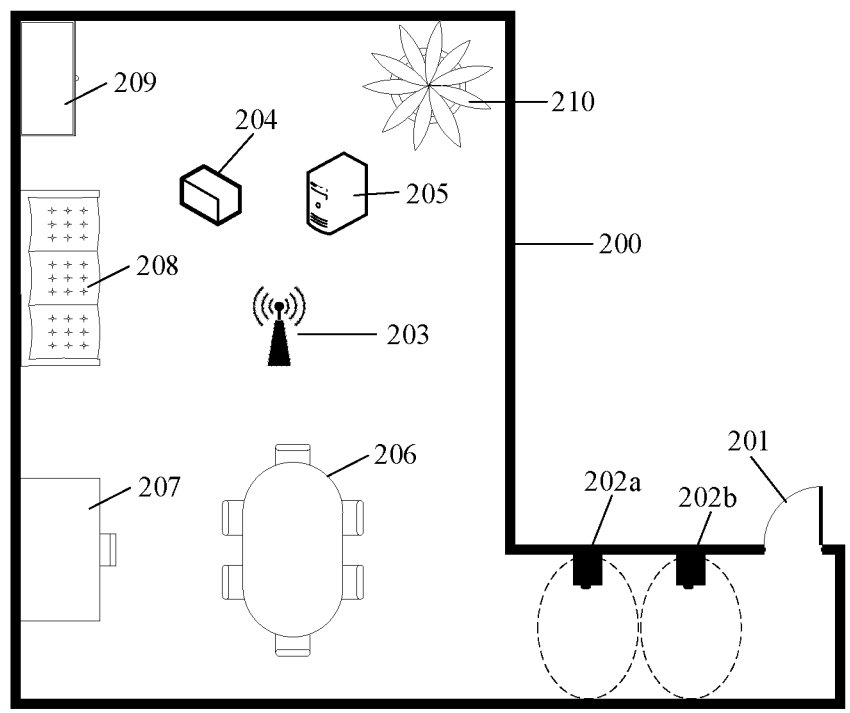
FIG. 2 is a diagram illustrating the layout of a workplace provided in the embodiment of the present disclosure.

The embodiment of the present disclosure provides an electronic work card. FIG. 1 is a structural diagram of the functions of the electronic work card provided in the embodiment of the present disclosure. FIG. 2 is a diagram illustrating the layout of a workplace provided in the embodiment of the present disclosure. FIG. 2 is a diagram of the system containing the electronic work card and the components that cooperate with the electronic work card to realize the functions related to the electronic work card.

The system includes actuators (actuator 202a and actuator 202b as shown in the drawings). In order to accurately determine whether the electronic work card enters or leaves the workplace, at least two actuators can be set. The actuator can radiate the electromagnetic signal within a certain range, so at least two actuators can be set at a certain distance from the electronic work card and in a continuous working state, or the working time of the actuator can be set according to the actual needs. One of the implementation modes is to arrange at least two actuators 202a and 202b at a set position (for example, near an entrance 201) in workplace 200.

As shown in FIG. 1, the electronic work card includes the controller 101 and the RFID device 102.

The RFID device 102 is configured to identify an actuator in the environment, receive the identification information provided by the actuator when identifying the actuator, and send the trigger information to the controller 101.

The controller 101 is configured to obtain the identification information of the actuator after receiving the trigger information of the actuator, determine whether the electronic work card is in the preset workplace according to the identification information; and in response to determining that the electronic work card is not in a preset workplace, control at least part of the functions of the electronic work card to enter the non-working state.

The embodiment of the present disclosure provides the electronic work card, where the controller determines whether the electronic work card is in the preset workplace according to the identification information of the actuator sent by the RFID device, and in response to determining that the electronic work card is not in a preset workplace, controls at least part of the functions of the electronic work card to enter the non-working state, thereby reducing the power consumption of the electronic work card which is out of the workplace. Moreover, the RFID device is passive and does not need power supply. Therefore, the electronic work card has lower power consumption and a longer standby time.

In specific implementation, when there are at least two actuators in the preset workplace, the above mentioned RFID device 102 is configured to identify at least two actuators successively in the environment, receive the identification information provided by the at least two actuators when each actuator is identified, and send the trigger information to the controller 101.

The controller 101 is configured to obtain the identification information of each of the at least two actuators after receiving the trigger information of at least two actuators, determine whether the electronic work card is in the preset workplace according to the identification information; and in response to determining that the electronic work card is not in a preset workplace, control at least part of the functions of the electronic work card to enter the non-working state.

At the same time, referring to FIG. 2, at least two actuators are set in the workplace 200. For example, in FIG. 2, two actuators, actuator 202a and actuator 202b, respectively, are set near the entrance 201 of the workplace 200, and the actuators can radiate electromagnetic signals within a certain range.

The RFID device 102 can be connected to the controller 101 through a peripheral interface and an output port, and the peripheral interface, for example, can be an Inter-Integrated Circuit (IIC) interface. The RFID device 102 generally has a coil.

When the electronic work card is in the radiation range of the actuator, the actuator and the RFID device 102 on the electronic work card can sense each other. When the actuator senses the RFID device 102, the actuator can activate the RFID device 102 and write the identification information in the RFID device 102. The identification information can include marking information that one actuator uses to distinguish from other actuators, the strength information of the electromagnetic signal, etc., so that the controller 101 can subsequently determine according to the identification information which actuator the electronic work card has approached.

The coil in the RFID device 102 is capable of converting the electromagnetic signal radiated by the actuator into energy and storing the energy, where the energy is proportional to the strength information of the electromagnetic signal. The RFID device 102 can be connected to the controller 101 through a peripheral interface and an output port. When the stored energy reaches a threshold, the RFID device 102 produces the trigger information, and activates the controller 101 through the interrupt function of the output port. After the controller 101 is activated, the controller 101 reads the identification information stored in the RFID device 102 through the peripheral interface.

Take the workplace shown in FIG. 2 as an example, when an employee with the electronic work card enters the workplace through the entrance 201 of the workplace 200, the electronic work card and the actuators perform signal interaction according to the steps shown in FIG. 3, in some embodiments, the steps are as follows:

S10. the actuator 202b sends an electromagnetic signal;

S11. the RFID device of the electronic work card identifies the electromagnetic signal;

S12. the actuator 202b writes the identification information to the RFID device, and the identification information is configured to distinguish the different actuators;

S13. the RFID device sends the trigger information to the controller;

S14. the controller reads the identification information in the RFID device;

S15. the actuator 202a sends an electromagnetic signal;

S16. the RFID device of the electronic work card identifies the electromagnetic signal;

S17. the actuator 202a writes the identification information to the RFID device, and the identification information is configured to distinguish the different actuators;

S18. the RFID device sends the trigger information to the controller;

S19. the controller reads the identification information in the RFID device.

Steps S10 and S15 are in no particular order, and can be carried out at the same time for example.

The controller can determine the radiation range of which actuator the electronic work card has approached according to the identification information. Therefore, when the controller first receives the identification information of the actuator 202b and then receives the identification information of the actuator 202a, the controller can determine that the electronic work card approaches the radiation range of the actuator 202b first, then approaches the radiation range of the actuator 202a, thereby determining that the electronic work card enters the workplace. The principle of the employee leaving the workplace with the electronic work card is similar to the principle of entering the workplace, so no detailed explanation will be given here.

Generally speaking, the distance of the two actuators at the set position is short, so the time the employee with the electronic work card uses to pass by the two actuators is short. That is, the time interval for the controller of the electronic work card to receive the identification information of the two actuators is very short. Consequently, when the state of the electronic work card is determined, the time information can be taken into consideration, which can improve the accuracy of the controller to determine the state of the electronic work card. In conclusion, the controller can determine the state of the electronic work card according to the time sequence of the received identification information and time delay information. Moreover, when determining that the electronic work card is out of the workplace, the controller can control at least part of the functions of the electronic work card to enter the non-working state, thus greatly reducing the power consumption of the electronic work card. In some embodiments, the controller controls at least part of the functions of the electronic work card to enter the non-working state, which can be understood as that the controller turns off at least part of the functions which have power consumption of the electronic work card.

Above is the explanation by taking FIG. 2 in which two actuators are set at the same set position as an example. In specific implementation, three, four or more actuators can be set at the same position, or the actuators can be set at multiple positions. The principle for the controller to determine the state of the electronic work card is similar to the above principle, so no detailed explanation will be given here.

In specific implementation, only one actuator can be set for the workplace with simple internal composition. It can be controlled as follows: switching the working state every time when the electronic work card passes by the actuator. For example, when the electronic work card passes by the actuator for the first time, the electronic work card is determined to enter the workplace, and is controlled to enter the working state. When the electronic work card passes by the actuator for the second time, the electronic work card is determined to leave the workplace, and is controlled to enter the non-working state.

In addition, the RFID device can further include a near-field identification module such as a 13.56 MHz Radio Frequency Identification (RFID) card to realize the roles as an access control card and a meal card, so that the electronic work card has good compatibility. And these functions do not depend on power, and can be implemented in the passive state, thereby increasing no power consumption of the electronic work card.

In order to communicate with the gateway and the server, and further to realize the data information interaction with the gateway and the server, the electronic work card provided in the embodiment of the present disclosure, as shown in FIG. 1, may further include a communication circuit 105 electrically connected to the controller 101.

The controller 101 is configured to connect to the gateway via the communication circuit 105 when the electronic work card is determined to be in the preset workplace.

The controller 101 is further configured to disconnect the communication circuit 105 and the gateway when the electronic work card is determined to be out of the preset workplace.

Meanwhile, according to FIG. 2, a server 205 can be set up in the workplace 200 to collect and process data information sent by each electronic work card, and send data information to each electronic work card so as to realize the unified management of each electronic work card.

In order to realize the signal interaction of the electronic work card with the server 205, the gateway 204 can be set in the workplace 200, and the electronic work card realizes the network connection with the gateway 204 through the communication circuit 105. In particular, the communication circuit 105 can be a wireless communication circuit, and can be connected to the controller 101 through the peripheral interface such as the Serial Peripheral Interface (SPI).

Figure 4:
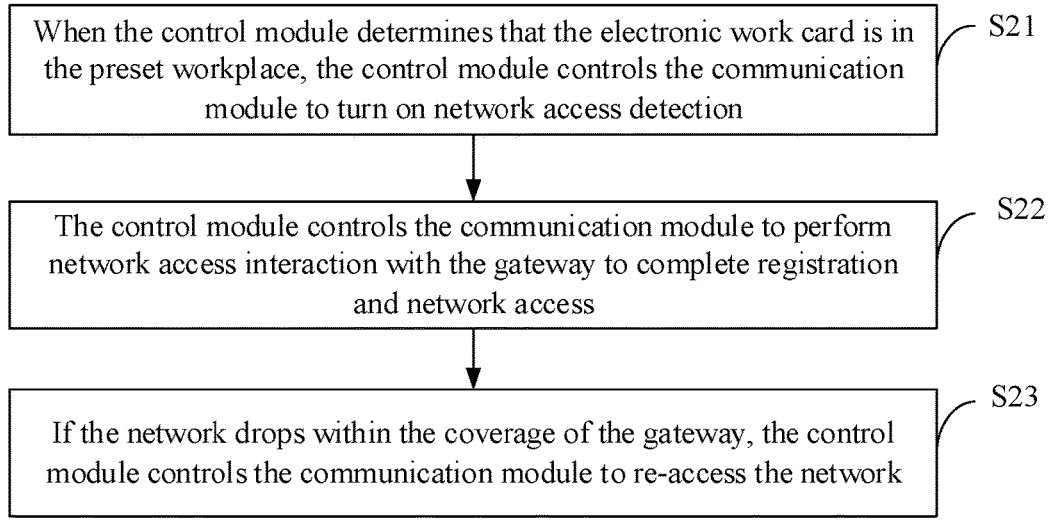
FIG. 4 is a flow diagram of positioning detection of the electronic work card in the embodiment of the present disclosure.

After leaving the workplace, the electronic work card enters the non-working state and does not need to perform data interaction with the server when the electronic work card is out of the workplace. That is, the electronic card does not need to access the network when the electronic work card is out of the workplace. Hence, when the electronic work card is in the workplace, the controller 101 realizes network connection with the gateway 204 through the communication circuit 105, and the network access process of the electronic work card can be performed according to the steps as shown in FIG. 4, in some embodiments, the steps are as follows, S21. when the controller determines that the electronic work card is in the preset workplace, the controller controls the communication circuit to turn on network access detection;

S22. the controller controls the communication circuit to perform network access interaction with the gateway to complete registration and network access; and S23. if the network drops within the coverage of the gateway, the controller controls the communication circuit to re-access the network.

The electronic work card can be off the network due to the possibility of signal interference or other reasons, but the electronic work card can be reconnected to the network after the electronic work card is off the network so as to ensure the smooth data interaction between the controller and the server.

In specific implementation, the network coverage of the gateway can cover the actuator, and thus the electronic work card cannot be off the network immediately after leaving the workplace. The electronic work card is still able to interact with the server and be maintained within the network within the network coverage, but when the electronic work card is out of the network coverage and is off the network, the electronic work card is not able to realize network connection with the gateway. Hence, when the electronic work card is determined to be out of the preset workplace, the function of the communication circuit is controlled to be in the closed state, and the electronic work card no longer detects the network status and enters a non-working state with low power consumption.

In order to further reduce the power consumption of the electronic work card, when the electronic work card enters the workplace, the controller can be switched between the working state and the non-working state according to a certain period. In some embodiments, the electronic work card provided in the embodiment of the present disclosure further includes a timing circuit.

The timing circuit is configured to periodically send wake-up information to the controller when the electronic work card is in the preset workplace.

The controller is configured to control the communication circuit to stop the network maintenance information interaction with the gateway before receiving the wake-up information, and control the communication circuit to perform network maintenance information interaction with the gateway after being triggered by the wake-up information.

In order to further reduce the power consumption of the electronic work card, when the electronic work card is in the preset workplace, the electronic work card can be controlled not to be always in a working state. Instead, the electronic work card is switched between the working state and the non-working state according to a certain rule. That is, the controller is not always in data transmission when the controller is in the workplace, but carries out intermittent data transmission. The controller can be awakened through the timing circuit to perform data transmission with the gateway. For example, the timing circuit can send wake-up information to the controller every five seconds, and the controller completes data transmission with the gateway in one second, and is in the non-working state for the rest four seconds. This can further reduce the power consumption of the electronic work card and save power. An example is just provided herein for explanation and does not mean to limit the time of sending the wake-up information by the timing circuit and the time of data transmission.

The controller can turn on the communication circuit under the control of the wake-up information, and perform network maintenance information interaction with the gateway through the communication circuit. For example, a data package can be sent to perform network maintenance information interaction. If the communication circuit sends a data package to the gateway and receives the data package sent by the gateway within the set time, it means that the network connection between the communication circuit and the gateway is normal. If the communication circuit sends a data package to the gateway but does not receive a data package returned from the gateway for a long time, it means that the network connection between the communication circuit and the gateway is abnormal, and signal interference or network interruption may happen. In order to guarantee smooth data transmission between the communication circuit and the gateway, in specific implementation, the controller can be set to control the communication circuit to access the network again when the number of abnormal network connections within a certain time is detected to be high. For example, when there are three consecutive abnormal network connections within five seconds, the communication circuit can be controlled to access the network again, which can not only guarantee data transmission between the communication circuit and the gateway, but further avoid the repetitive network access under the temporary network connection exception caused by signal interference.

The network connection between the communication circuit and the gateway can synchronize the complete time of the controller and the server, and can further make the controller send the data information such as the position information of the electronic work card to the server. The server can analyze the moving track of the electronic work card according to the position information of the electronic work card at multiple moments in order to better grasp the working condition of the employee. In addition, the server can further send some data information to the electronic work card through the gateway. For example, the server can send the message such as "come to the conference room half an hour later" to each electronic work card, and after receiving the message, all the employees can send confirmation information back through buttons on the electronic work card, or the server can further send via the gateway to the electronic work card a message to refresh the display information of the display module.

Furthermore, the electronic work card provided in the embodiment of the present disclosure can further realize positioning detection. In some embodiments, as shown in FIG. 1, the electronic work card can further include an inertial measurement component 103 electrically connected to the controller 101 and a positioning information detector 104.

The inertial measurement component 103 is configured to determine whether the cumulative displacement of the electronic work card within the set time is greater than the preset threshold when the controller 101 determines that the electronic card is in the preset workplace, in response to determining that the cumulative displacement of the electronic work card within the set time is greater than the preset threshold, control the positioning information detector 104 to detect the positioning information broadcasted in the environment by the controller; and in response to determining that the cumulative displacement of the electronic work card within the set time is not greater than the preset threshold, control the positioning information detector 104 to stop detecting the positioning information broadcasted in the environment.

The positioning information detector 104 is configured to turn on the detection of the positioning information broadcasted in the environment or turn off the detection of the positioning information broadcasted in the environment under the control of the controller 101.

Meanwhile, referring to FIG. 2, in order to realize the positioning function of the electronic work card, a positioning signal transmitter 203 can be set in the workplace 200. The positioning signal transmitter 203 can be either an iBeacon signal transmitter or other signal transmitters, which is not defined here. The positioning signal transmitter 203 can transmit the positioning information according to a set rule. In some embodiments, the positioning signal transmitter 203 can send the positioning information in the form of broadcasting. FIG. 2 takes a positioning signal transmitter 203 as an example. In specific implementation, in order to improve the accuracy of positioning detection, multiple positioning signal transmitters 203 can be set in the same workplace, and the positioning information detector 104 can be used to detect the positioning information of each positioning node in order to realize positioning detection of more dimensions so as to improve the accuracy of positioning detection of the electronic work card. The number and position of the positioning signal transmitters 203 are not limited here.

After detecting the positioning information broadcasted in the environment, the positioning information detector 104 in the electronic work card can determine the position information of the electronic work card through the controller 101 so as to realize the indoor positioning function of the electronic work card. In some embodiments, the positioning information detector 104 can be connected to the controller 101 through a peripheral interface, and the peripheral interface can be a Universal Asynchronous Receiver/Transmitter (UART) or a Serial Peripheral Interface (SPI).

In practice, when the employee with the electronic work card is in a certain position for a long time, the position information of the electronic work card changes little. Take the workplace 200 in FIG. 2 as an example. The workplace 200 includes a table 206, a desk 207, a sofa 208, a cabinet 209 and green plant 210. Some employees may write materials at the desk 207, may sit on a sofa 208 for rest, or several employees may have a meeting at the table 206. There is no need to detect the position information of the electronic work card all the time in these cases. In the embodiment of the present disclosure, the position information of the electronic work card is detected only when the inertial measurement component 103 detects that the electronic work card has certain cumulative displacement in the set time. When the inertial measurement component 103 detects that the electronic work card has small cumulative displacement in the set time, controls the positioning information detector 104 to stop detecting the positioning information broadcasted in the environment so as to realize the switch between the working state and the non-working state of the controller 101 and the positioning information detector 104 to further reduce the power consumption of the electronic work card.

Figure 5:
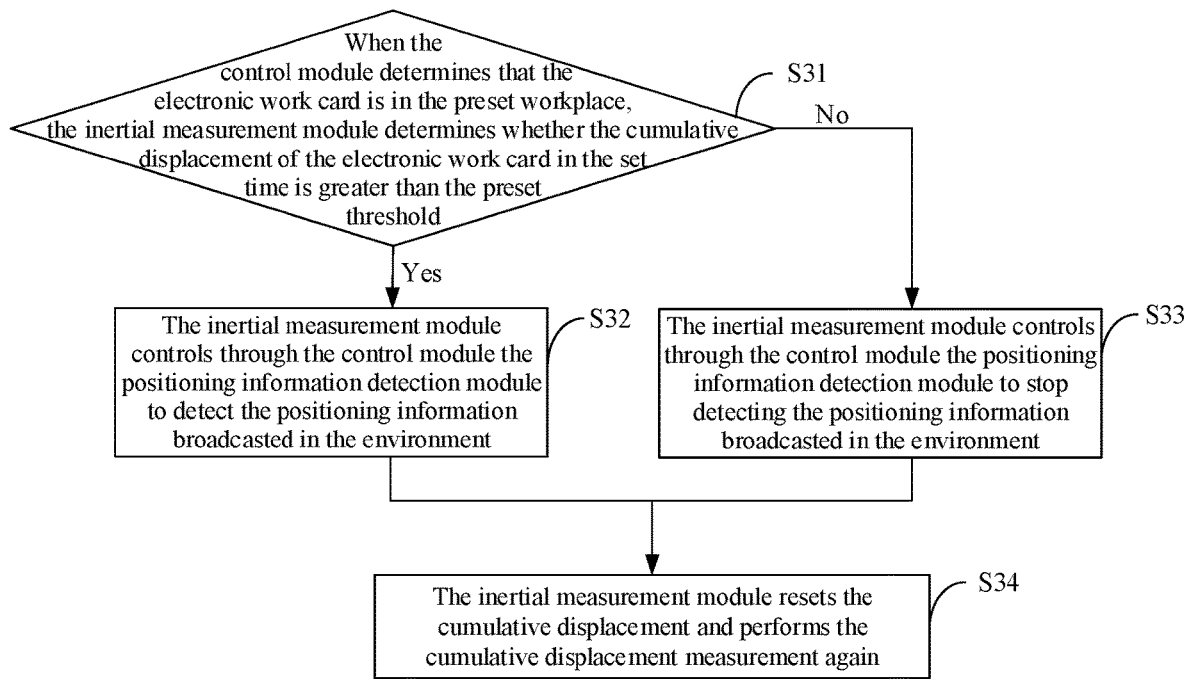
FIG. 5 is a flow diagram of network access of the electronic work card in the embodiment of the present disclosure.

The above electronic work card can be positioned and detected according to the steps shown in FIG. 5, in some embodiments, the steps are as follows:

S31. when the controller determines that the electronic work card is in the preset workplace, the inertial measurement component determines whether the cumulative displacement of the electronic work card in the set time is greater than the preset threshold. In response to determining that the cumulative displacement of the electronic work card in the set time is greater than the preset threshold, step S32 will be implemented, in response to determining that the cumulative displacement of the electronic work card in the set time is not greater than the preset threshold, step S33 will be implemented. For example, the preset threshold can be 2 meters, indicating that the positioning information detection function will not be enabled when the electronic work card moves within the range of 2 meters. If the cumulative displacement of the electronic work card is greater than 2 meters, the positioning information detection function will be enabled. Here is just an example and does not means to limit the preset threshold;

S32. the inertial measurement component controls through the controller the positioning information detector to detect the positioning information broadcasted in the environment;

S33. the inertial measurement component controls through the controller the positioning information detector to stop detecting the positioning information broadcasted in the environment;

S34. the inertial measurement component resets the cumulative displacement and performs the cumulative displacement measurement again.

Since there is no need to detect the position of the electronic work card after the electronic work card leaves the preset workplace, the inertial measurement component is set to detect the cumulative displacement of the electronic work card when the inertial measurement component determines that the electronic work card is in the preset workplace. In specific implementation, the electronic work card can perform data interaction with the server in the workplace through the way of wireless network. Therefore, the inertial measurement component can be controlled to detect the cumulative displacement after the electronic work card accesses the network. In some embodiments, the above inertial measurement component 103 includes an acceleration sensor, a gyroscope and the like so as to realize the measurement of the cumulative displacement of the electronic work card, and in order to achieve data signal transmission, the inertial measurement component 103 can be connected to the controller 101 through the peripheral interface such as the Inter-Integrated Circuit (IIC) interface.

In practice, in the electronic work card provided in the embodiment of the present disclosure, the controller 101 is configured to turn off the function of at least one of the timing circuit, the inertial measurement component 103, and the positioning information detector 104 when the electronic work card is determined to be out of the preset workplace so as to make the electronic work card enter the non-working state.

That is, when the electronic work card is in the non-working state, the controller at least turns off part of power consumption functions of the electronic work card so as to make the electronic work card enter the non-working state. Since the RFID device 102 is a passive device, there is no need to close the RFID device 102 when the electronic card is in the non-working state.

In some embodiments, the above electronic work card provided in the embodiment of the present disclosure, as shown in FIG. 1, may further include a power circuit 108 electrically connected to the controller 101.

The controller 101 is configured to turn off the power circuit 108 when the electronic work card is out of the preset workplace.

The power circuit 108 may include a power supply (for example, a dry battery or a storage battery, etc.) and a power management unit. The power management unit can realize charge and discharge management of the power supply, as well as power management functions. Since the electronic work card is mainly used in the workplace, the power circuit 108 can be turned off after leaving the preset workplace, thus further saving the power consumption of the electronic work card.

In addition, in the above electronic work card in the embodiment of the present disclosure, the controller 101 is further configured to determine the duration of residence of the electronic work card in the preset workplace according to the time information of receiving the triggering information corresponding to the actuator.

Figure 3:
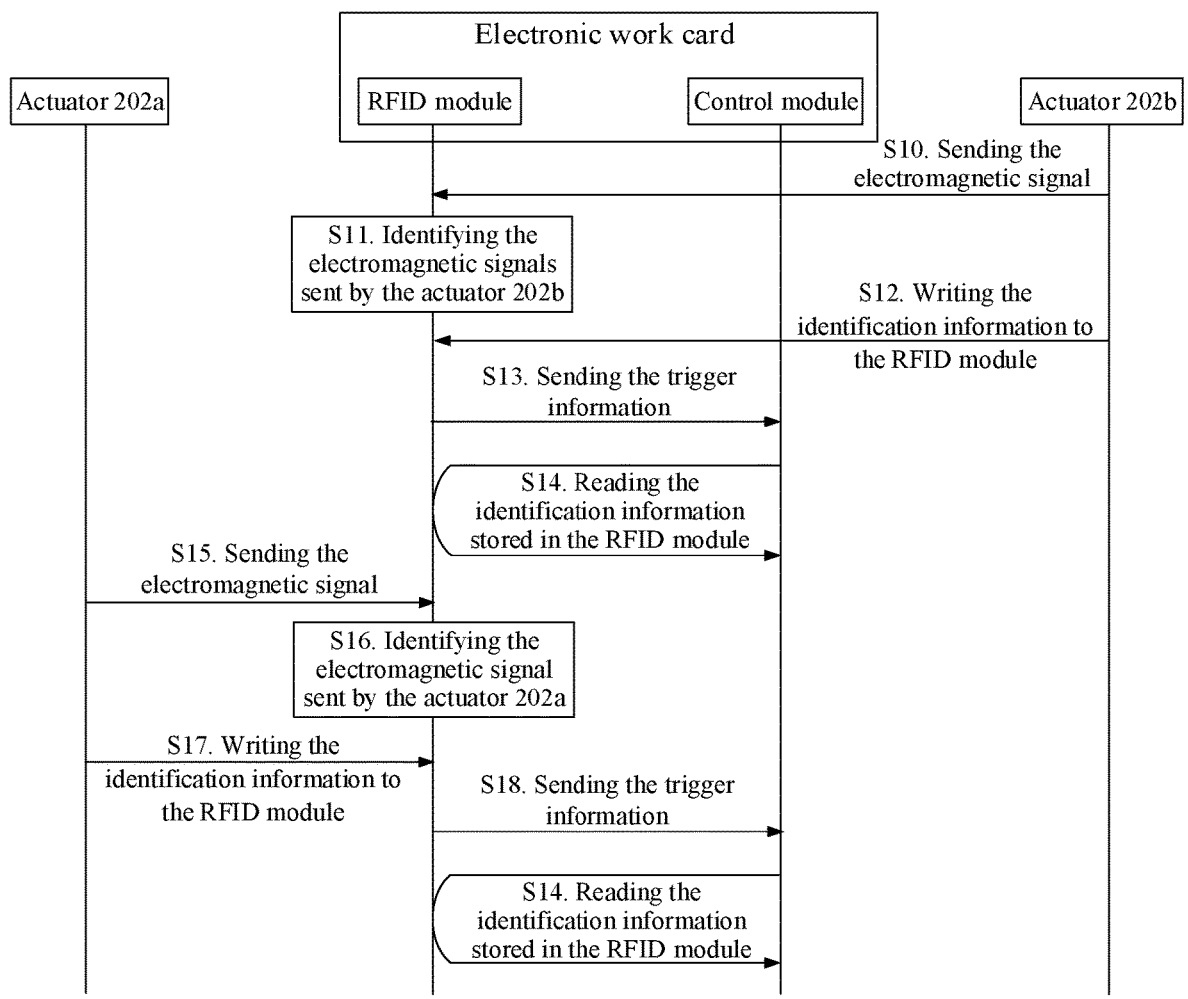
FIG. 3 is a flow diagram of signal interaction between the electronic work card and the actuator in the embodiment of the present disclosure.

The diagram of signal interaction between the electronic work card and the actuator as shown in FIG. 3 shows that the controller can receive the trigger information of the actuator sent by the RFID device every time when the electronic work card passes by one actuator. Therefore, the duration of residence of the electronic work card in the preset workplace can be determined according to the time information of the triggering information received by the controller. Take the workplace 200 as shown in FIG. 2 as an example, when the electronic work card enters the workplace 200, the moment when the triggering information of the actuator 202b is received is recorded as $t_1$, and the moment when the triggering information of the actuator 202a is received is recorded as $t_2$, when the electronic work card leaves the workplace 200, the moment when the triggering information of the actuator 202a is received is recorded as $t_3$, and the moment when the triggering information of the actuator 202b is received is recorded as $t_4$. The duration of residence of the electronic work card in the preset workplace refers to the difference of the moments when the electronic work card passes by the same actuator. That is, the duration of residence can be $t_4-t_1$ or $t_3-t_2$, or can be calculated in other ways, which is not defined here.

The controller can be used to determine the duration of residence of the electronic work card in the workplace. If the working hours of an employee cannot meet the company's regulations, the display module can be used to prompt the employee to prevent early leaving, which is conducive to the management of the company.

In addition, the controller can further record the moments when the electronic work card enters and leaves the workplace so as to realize the function of automatic clocking in of the electronic work card. There is no need for the employee to clock in manually so as to avoid the unnecessary trouble caused when the employee forgets clocking in, which is conducive to the management of the company.

The controller can further send the time when the electronic work card enters and leaves the workplace and the duration of residence to the server. The server can conduct comprehensive work evaluation on the corresponding employee based on the information and the moving track of the electronic work card so as to fully understand the working condition of employee.

In specific implementation, the above electronic work card provided in the embodiment of the present disclosure, as shown in FIG. 1, may further include a display module 106 electrically connected to controller 101.

The controller 101 is configured to display via the display module 106 the basic employee information or data information sent by the server.

The display module 106 electrically connected to controller 101 is set in the electronic work card, and can be used to display employee information such as head portrait, name, position and job number. In this way, the information on the electronic work card can be changed conveniently. For example, when the basic information of the employee on the electronic work card is wrong, the display information on the display module can be changed through the server without replacing the electronic work card. Moreover, the electronic work card can be used repeatedly. For example, if an employee quits, the basic information of this employee on the corresponding electronic work card can be changed to the basic information of another employee, and the display module 106 can further display the data information sent by the server. For example, the server can send notification information or assign tasks to the corresponding electronic work card of an employee, and the server can further send announcements, collective notices and other messages to each electronic work card.

In some embodiments, the above display module 106 can be an e-ink display panel. The e-ink display panel can maintain the display content without power supply after refreshing, and thus the power consumption is lower, which can further reduce the total power consumption of the electronic work card.

In practice, the above electronic work card provided in the embodiment of the present disclosure, as shown in FIG. 1, may further include a button 107 electrically connected to the controller 101.

The controller 101 is configured to send notification information to the server after the button 107 is triggered to enable the server to control the electronic work card to realize the corresponding functions.

Through setting on the electronic work card the button 107 electrically connected to the controller 101, the employee can realize through the button 107 the functions such as information confirmation, display content update, and one-button alarming. For example, when the server sends to the electronic work card the message "come to the conference room half an hour later, and please reply if you receive the message", the employee can reply by triggering the button 107 after receiving the message on the electronic work card. In some embodiments, after the employee triggers the button 107, the button 107 can send trigger information to the controller 101. When the controller 101 detects that the button 107 is triggered, the controller 101 sends to the server the confirmation information. When the content displayed on the electronic work card needs to be updated, the employee can trigger the button 107 to send an update instruction to the server. After receiving the update instruction, the server sends the updated data to the controller 101 to control the display module 106 to refresh the display content. When the employee encounters a dangerous situation, the employee can trigger the button 107 to send an alarm signal to the server, and the server can contact the emergency contact person, police or hospital in some ways, which can be set in advance according to the actual situation. In specific implementation, the functions of the button 107 can be distinguished according to the way of triggering the button 107. For example, if the button is pressed for one time, the received information is replied; if the button is pressed twice consecutively, the display information is updated; if the button is long pressed, an alarm is given. These functions can further be differentiated by increasing the number of the button 107, and no limitation will be made here. It should be noted that the button 107 can be a physical button or a virtual button on the display module, and the type of the button 107 is not be limited here.

In addition, the timing cycle of the above timing circuit can be interrupted by the button 107 on the electronic work card. At any time, the controller can be awakened by the button 107 to complete the functions of information response or one-button alarming.

Based on the same inventive concept, the embodiment of the present disclosure further provides an attendance management system. Since the attendance management system solves the problem in a way similar to the aforementioned electronic work card, the implementation of the attendance management system can refer to the implementation of the above electronic work card, and the repetition will not be repeated herein.

The attendance management system provided in the embodiment of the present disclosure, as shown in FIG. 2, includes the above electronic work card, and the actuators (202a and 202b as shown in the drawing); in order to accurately determine whether the electronic work card enters or leaves the workplace, at least two actuators can be set.

The actuator is configured to radiate the electromagnetic signal within a certain range and write identification information to the RFID device after identifying the RFID device of the electronic work card;

The identification information is configured to distinguish the different actuators.

The attendance management system, as provided in the embodiment of the present disclosure, includes the electronic work card and the actuators. The actuator can radiate electromagnetic signal within a certain range and write identification information to the RFID device after identifying the RFID device of the electronic work card. The controller in the electronic work card can determine according to the identification information whether the electronic work card is in the preset workplace. When the controller determines that the electronic work card is out of the workplace, the controller controls at least part of the functions of the electronic work card into the non-working state, thereby reducing the power consumption after the electronic work card leaves the workplace, reducing the power consumption of the electronic work card, and realizing the intelligent management of the attendance management system.

In FIG. 2, an example of setting two actuators (202a and 202b) near the entrance 201 of the workplace 200 is given. In specific implementation, the exact number of the actuators can be set according to the specific environment and actual need of the workplace 200. For example, when there are two entrances in the workplace, two actuators can be set at each entrance, or when there is no suitable space at the entrance to set the actuators, the actuators can be set at other positions in the workplace. The number of the actuators can be set according to the actual situation, and the position of the actuator can be set according to the shape and size of the workplace 200.

The above attendance management system provided in the embodiment of the present disclosure may be applied to but not limited to the intelligent office, and may further be applied to the intelligent hospital, the intelligent shopping mall and other places, and no limitation will be made herein.

Furthermore, in order to realize the positioning function of each electronic work card, the above attendance management system provided in the embodiment of the present disclosure may further include a positioning signal transmitter 203.

The positioning signal transmitter 203 is configured to transmit the positioning information in a set rule.

The positioning signal transmitter 203 can be either an iBeacon transmitter or other signal transmitters, which is not defined here. The positioning signal transmitter 203 can transmit the positioning information according to the set rule. For example, the positioning signal transmitter 203 can send the positioning information in the form of broadcasting. After detecting the positioning information, the positioning information detector 104 in the electronic work card can determine the position information of the electronic work card through the controller 101 so as to realize the indoor positioning function of the electronic work card.

In FIG. 2, one positioning signal transmitter 203 is given as an example. In specific implementation, in order to improve the accuracy of positioning detection, multiple positioning signal transmitters 203 can be set in the same workplace, and the positioning information detector 104 can be used to detect the positioning information of each positioning node in order to realize positioning detection of more dimensions so as to improve the accuracy of positioning detection by the electronic work card. The number and position of the positioning signal transmitters 203 are not limited here.

In addition, the above attendance management system provided in the embodiment of the present disclosure, as shown in FIG. 2, may further include a gateway 204 and a server 205 electrically connected to the gateway 204.

The gateway 204 is configured to realize network connection with the communication circuit in the electronic work card and perform network maintenance information interaction with the communication circuit.

The server 205 is configured to perform data information interaction with the electronic work card via the gateway 204.

Through setting the server 205 and the gateway 204 electrically connected to the server 205 in the workplace 200, the signal interaction between the server 205 and each electronic work card can be implemented so that the server 205 can collect and process data information sent by each electronic work card, and send data information to each electronic work card so as to realize the unified management of each electronic work card, for example, the server can implement time synchronization with the electronic work card. In addition, the server 205 can better know the working condition of the employee by analyzing the moving track of the electronic work card according to the position information of multiple moments of the electronic work card in combination with the time when the electronic work card enters and leaves the workplace. The server 205 can further send announcements uniformly, and provide alarm services for employees in case of emergency.

Figure 6:
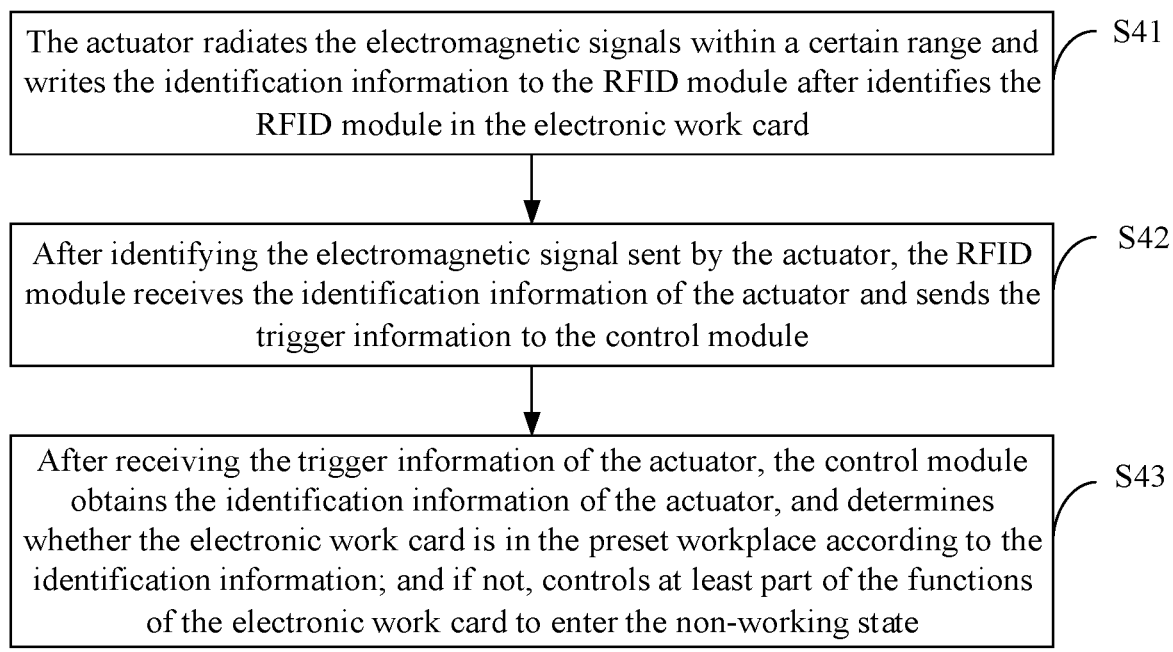
FIG. 6 is a flow diagram of the control method of the attendance management system provided in the embodiment of the present disclosure.

The control method of the above attendance management system provided in the embodiment of the present disclosure, as shown in FIG. 6, may include:

S41. the actuator radiates the electromagnetic signal within a certain range and writes the identification information to the RFID device after identifies the RFID device in the electronic work card;

S42. after identifying the electromagnetic signal sent by the actuator, the RFID device receives the identification information of the actuator and sends the trigger information to the controller;

S43. after receiving the trigger information of the actuator, the controller obtains the identification information of the actuator, determines whether the electronic work card is in the preset workplace according to the identification information; and in response to determining that the electronic work card is not in the preset workplace, controls at least part of the functions of the electronic work card to enter the non-working state.

Based on the same inventive concept, the embodiment of the present disclosure further provides a control method of the above electronic work card. Since the control method solves the problem in a way similar to the above electronic work card, the implementation of the control method can refer to the implementation of the above electronic work card. The repetition will not be repeated herein.

Figure 7:
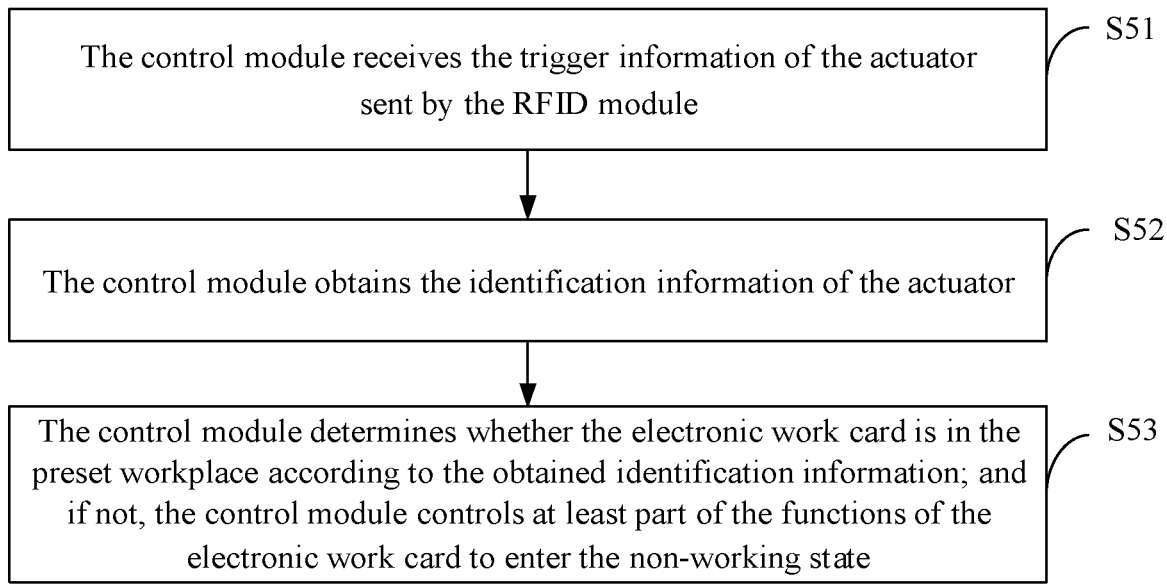
FIG. 7 is a flow diagram of the control method of the electronic work card provided in the embodiment of the present disclosure.

As shown in FIG. 7, the control method of the above electronic work card provided in the embodiment of the present disclosure may include:

S51. the controller receives the trigger information of the actuator sent by the RFID device;

S52. the controller obtains the identification information of the actuator;

S53. the controller determines whether the electronic work card is in the preset workplace according to the obtained identification information; and in response to determining that the electronic work card is not in the preset workplace, the controller controls at least part of the functions of the electronic work card to enter the non-working state.

In some embodiments, in the above control method provided in the embodiment of the present disclosure, the above step S53 that the above controller controls at least part of the functions of the electronic work card to enter the non-working state further includes the step:

when the controller determines that the electronic card is out of the preset workplace, the controller turns off the function of the communication circuit.

In some embodiments, the control method provided in the embodiment of the present disclosure may further include the steps:

the controller receives the wake-up information; the controller stops the communication circuit from performing network maintenance information interaction with the gateway before receiving the wake-up information;

the controller performs network maintenance information interaction with the gateway through the communication circuit after being triggered by the wake-up information, and performs data information interaction with the server through the gateway.

In some embodiments, the above control method provided in the embodiment of the present disclosure may further include the step: when the controller determines that the electronic work card is out of the preset workplace, the controller turns off at least one of the communication circuit, timing circuit, inertial measurement component and positioning information detector.

In some embodiments, the control method provided in the embodiment of the present disclosure may further include the step:

when the controller determines that the electronic work card is out of the preset workplace, the controller turns off the power circuit.

In some embodiments, the control method provided in the embodiment of the present disclosure may further include the step:

the controller determines the duration of residence of the electronic work card in the preset workplace according to the obtained time information of the identification information of the actuator.

Based on the same inventive concept, the embodiment of the present disclosure further provides a control device of the above electronic work card. Since the control device solves the problem in a way similar to the above electronic work card, the implementation of the control device can refer to the implementation of the above electronic work card. The repetition will not be repeated herein.

Figure 8:
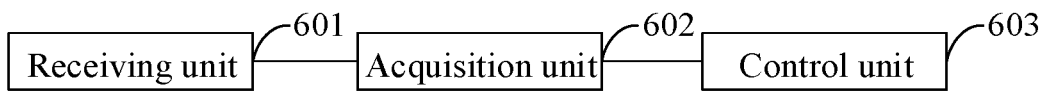
FIG. 8 is a structural diagram of the control device of the electronic work card provided in the embodiment of the present disclosure.

As shown in FIG. 8, the control device of the above electronic work card provided in the embodiment of the present disclosure may include:

a receiving unit 601, which is configured to receive the trigger information of the actuator sent by the RFID device;

an acquisition unit 602, which is configured to obtain the identification information of the actuator;

a control unit 603, which is configured to determine whether the electronic work card is in the preset workplace according to the obtained identification information; and in response to determining that the electronic work card is not in the preset workplace, control at least part of the functions of the electronic work card to enter the non-working state.

In some embodiments, in the control device provided in the embodiment of the present disclosure, the control unit 603 is configured to disconnect the communication circuit and the gateway when the electronic work card is determined to be out of the preset workplace.

In some embodiments, in the control device provided in the embodiment of the present disclosure, the receiving unit 601 is further configured to receive the wake-up information; the controller controls the communication circuit to stop the network maintenance information interaction with the gateway before receiving the wake-up information.

The control unit 603 is further configured to perform network maintenance information interaction with the gateway through the communication circuit after being triggered by the wake-up information and perform data information interaction with the server through the gateway.

Based on the same inventive concept, the embodiment of the present disclosure further provides a storage medium that stores the computer executable instructions used to cause the computer to execute the control method of the electronic work card.

The storage medium can be any of available media or data storage devices that can be accessed by the computer, including but not limited to a magnetic storage (such as a floppy disk, a hard disk, a magnetic tape, a magnetic optical disc (MO), etc.), an optical storage (such as a CD, a DVD, a BD, an HVD, etc.), and a semiconductor storage (such as an ROM, an EPROM, an EEPROM, a NAND FLASH, a solid-state drive (SSD), etc.)

The embodiment of the present disclosure provides the electronic work card, the control method and device thereof, the storage medium and the attendance management system thereof, wherein the controller in the electronic work card determines whether the electronic work card is in the preset workplace according to the identification information of the actuator sent by the RFID device; and in response to determining that the electronic work card is not in the preset workplace, can control at least part of the functions of the electronic work card to enter the non-working state, thereby reducing the power consumption of the electronic work card out of the workplace. Moreover, the RFID device is passive and does not need power supply. Therefore, the electronic work card has lower power consumption and a longer standby time, which can improve user experience. In addition, the electronic work card is not always in the working state after entering the workplace, instead, the electronic work card is switched between the working state and non-working state according to a certain rule so as to further reduce the power consumption of the electronic work card and save electric energy. In addition, the positioning information of the electronic work card can be detected only when the inertial measurement component detects that the electronic work card has a certain cumulative displacement within the set time, thereby further reducing the power consumption of the electronic work card. In addition, the electronic work card provided in the embodiment of the present disclosure further has the functions of an access control card and a meal card, and thus has good compatibility.

Although the preferred embodiments have been described in the present disclosure, additional changes and modifications may be made to these embodiments once the basic inventive concepts are known to those skilled in the field. The attached claims are therefore intended to be construed to include preferred embodiments and all changes and modifications falling within the scope of the present disclosure.

It is clear that those skilled in the field can make various changes and variations to the embodiment of the present disclosure without deviating from the spirit and scope of the embodiment of the present disclosure. Thus, the present disclosure is intended to include such changes and variations if they fall within the scope of the claims of the present disclosure and the technical equivalents thereof.

The invention claimed is:

1. An electronic work card, comprising a controller and a Radio Frequency Identification (RFID) device;

the RFID device is configured to identify at least one actuator located in an environment, receive identification information provided by the at least one actuator when the at least one actuator is identified, and send trigger information to the controller; and the controller is configured to obtain the identification information of the actuator after receiving the trigger information of the actuator, determine whether the electronic work card is in a preset workplace according to the identification information, and in response to determining that the electronic work card is not in a preset workplace, control at least part of functions of the electronic work card to enter a non-working state.

2. The electronic work card according to claim 1, wherein the RFID device is configured to successively identify at least two actuators in the environment, receive the identification information provided by each of the at least two actuators upon identifying each of the at least two actuators, and send the trigger information to the controller; and the controller is configured to obtain identification information of each of the at least two actuators after receiving trigger information corresponding to each of the at least two actuators, determine whether the electronic work card is in the preset workplace according to the identification information, and in response to determining that the electronic work card is not in the preset workplace, control at least part of the functions of the electronic work card to enter the non-working state.

3. The electronic work card according to claim 2, wherein the electronic work card further comprises a communication circuit electrically connected to the controller;
the controller is configured to realize network connection with a gateway through the communication circuit when the electronic work card is determined to be in the preset workplace; and
the controller is further configured to disconnect the communication circuit and the gateway when the electronic work card is determined to be out of the preset workplace.

4. The electronic work card according to claim 3, wherein the electronic work card further comprises a timing circuit;
the timing circuit is configured to periodically send wake-up information to the control module when the electronic work card is in the preset workplace; and
the controller is configured to control the communication circuit to stop network maintenance information interaction with the gateway before receiving the wake-up information, and control the communication circuit to perform network maintenance information interaction with the gateway after being triggered by the wake-up information.

5. The electronic work card according to claim 1, wherein the electronic work card further comprises an inertial measurement component and a positioning information detector;
the inertial measurement component is configured to determine whether cumulative displacement of the electronic work card within a set time is greater than a preset threshold when the controller determines that the electronic work card is in the preset workplace; in response to determining that the cumulative displacement of the electronic work card within a set time is greater than a preset threshold, control the positioning information detector to detect the positioning information broadcasted in the environment by the controller; and in response to determining that the cumulative displacement of the electronic work card within a set time is not greater than a preset threshold, control the positioning information detector to stop detecting the positioning information broadcasted in the environment; and
the positioning information detector is configured to turn on detection of the positioning information broadcasted in the environment or turn off the detection of the positioning information broadcasted in the environment under control of the controller.

6. The electronic work card according to claim 5, wherein the controller is configured to turn off a function of at least one of a timing circuit, the inertial measurement component, and the positioning information detector when the electronic work card is determined to be out of the preset workplace.

7. The electronic work card according to claim 1, wherein the electronic work card further comprises a power circuit electrically connected to the controller; and
the controller is configured to turn off the power circuit when the electronic work card is out of the preset workplace.

8. The electronic work card according to claim 1, wherein the controller is further configured to determine duration of residence of the electronic work card in the preset workplace according to time information of receiving triggering information corresponding to the actuator.

9. An attendance management system, comprising the electronic work card according to claim 1 and the at least one actuators; each of the at least one actuator is configured to radiate an electromagnetic signal within a certain range, and write identification information to the RFID device after identifying the RFID device of the electronic work card; and the identification information is configured to distinguish different actuators.

10. The attendance management system according to claim 9, wherein the attendance management system further comprises a gateway and a server electrically connected to the gateway; the gateway is configured to realize network connection with a communication circuit in the electronic work card and perform network maintenance information interaction with the communication circuit; and the server is configured to perform data information interaction with the electronic work card through the gateway.

11. A control method of the electronic work card according to claim 1, comprising:
receiving, by the controller, the trigger information of the at least one actuator sent by the RFID device;
obtaining, by the controller, the identification information of the at least one actuator; and
determining, by the controller, whether the electronic work card is in the preset workplace according to the obtained identification information; and in response to determining that the electronic work card is not in the preset workplace, controlling, by the controller, at least part of the functions of the electronic work card to enter the non-working state.

12. The control method according to claim 11, wherein controlling at least part of the functions of the electronic work card to enter the non-working state by the controller, comprises: when the controller determines that the electronic work card is out of the preset workplace, turning off a function of a communication circuit.

13. The control method according to claim 12, wherein the control method further comprises:
receiving, by the controller, wake-up information; stopping, by the controller, the communication circuit from performing network maintenance information interaction with a gateway before receiving the wake-up information; and
performing, by the controller, network maintenance information interaction with the gateway via the communication circuit after being triggered by the wake-up information.

14. The control method according to claim 13, wherein the control method further comprises: turning off, by the controller, a function of at least one of the communication circuit, a timing circuit, an inertial measurement component, and a positioning information detector when the electronic work card is determined to be out of the preset workplace.

15. The control method according to claim 11, wherein the control method further comprises: turning off, by the controller, a power circuit when determining that the electronic work card is out of the preset workplace.

16. The control method according to claim 11, wherein the control method further comprises: determining, by the controller, duration of residence of the electronic work card in the preset workplace according to time information of receiving the identification information of the at least one actuator.

17. A control device of the electronic work card according to claim 1, comprising a memory and a processor;
wherein the processor is configured to read programs in the memory and perform a process of:
receiving the trigger information of the at least one actuator sent by the RFID device;
obtaining the identification information of the at least one actuator; and
determining whether the electronic work card is in the preset workplace according to the obtained identification information; and in response to determining that the electronic work card is not in the preset workplace, controlling at least part of the functions of the electronic work card to enter the non-working state.

18. The control device according to claim 17, wherein controlling at least part of the functions of the electronic work card to enter the non-working state comprises: turning off a function of a communication circuit when the electronic work card is out of the preset workplace.

19. The control device according to claim 18, wherein the processor is further configured to read programs in the memory and perform a process of: receiving wake-up information; controlling the communication circuit to stop network maintenance information interaction with a gateway before receiving the wake-up information; and performing the network maintenance information interaction with the gateway via the communication circuit after being triggered by the wake-up information.

20. A non-transitory storage medium, wherein the storage medium stores computer executable instructions configured to cause a computer to perform the control method according to claim 11.

* * * * *